Oct. 17, 1967  F. J. BROOKS  3,347,755
TEMPERATURE CONTROLLED CONVECTIVE DISTILLATION
AND VAPOR EVACUATION
Filed Feb. 24, 1964  2 Sheets-Sheet 1

INVENTOR
FREDERICK J. BROOKS
BY
Featherstonhaugh & Co.
ATTORNEYS

Oct. 17, 1967 F. J. BROOKS 3,347,755
TEMPERATURE CONTROLLED CONVECTIVE DISTILLATION
AND VAPOR EVACUATION
Filed Feb. 24, 1964 2 Sheets-Sheet 2

INVENTOR
FREDERICK J. BROOKS
BY
Fetherstonhaugh & Co.
ATTORNEYS

United States Patent Office 3,347,755
Patented Oct. 17, 1967

3,347,755
TEMPERATURE CONTROLLED CONVECTIVE DISTILLATION AND VAPOR EVACUATION
Frederick J. Brooks, 114 15th St. W., North Vancouver, British Columbia, Canada
Filed Feb. 24, 1964, Ser. No. 346,782
1 Claim. (Cl. 202—206)

ABSTRACT OF THE DISCLOSURE

A distillation apparatus having means for introducing heated gas into a salt water body and blower means for removing water vapor distilled from the body in heat exchange therewith, thus condensing the vapors. Thermostatic responsive means control the flow of heated gases and water vapor removal.

---

Figure 1:
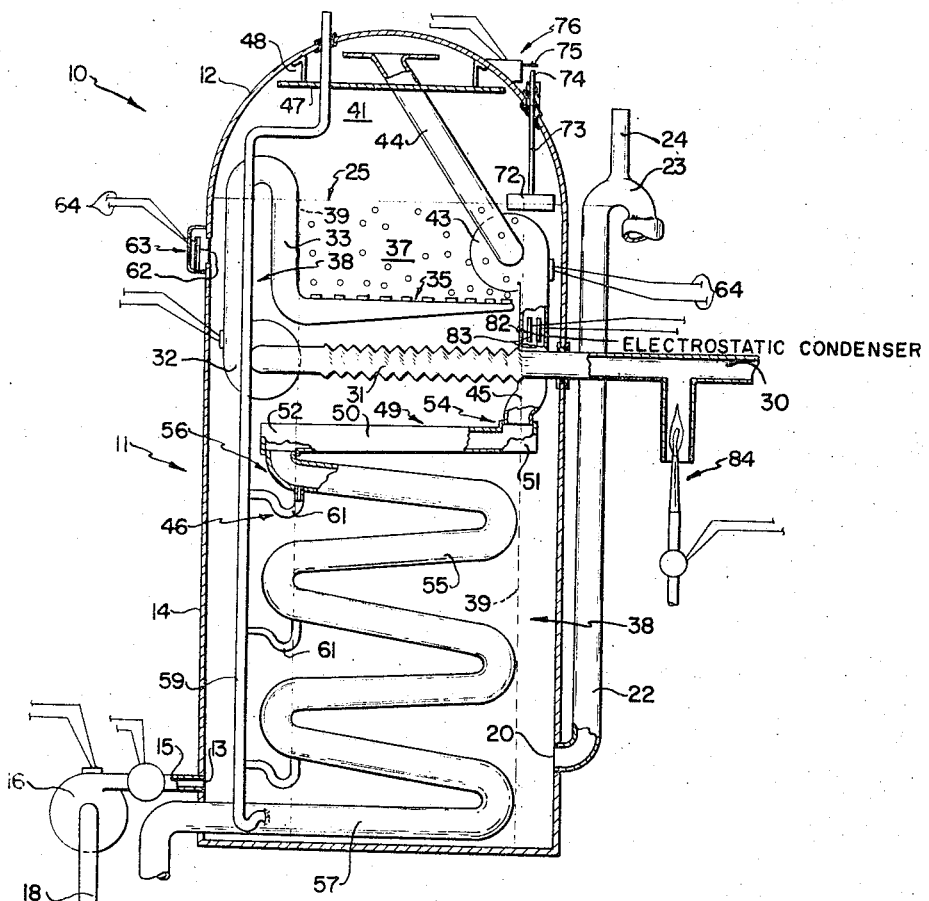

This invention relates to distillation apparatus for removing from a solution of liquids or of liquids and solids one of the liquids therein, and more particularly to a distillation apparatus for producing purified water from sea water.

A distillation of sea water to produce fresh water is perhaps one of the oldest methods used in the production of fresh water. However, in areas where sunlight is not always readily available, the consumption of power necessary to achieve evaporation of the sea water at a rate sufficient to produce a reasonble quantity of fresh water, and the loss of heat in subsequent condensation has always proven a serious drawback owing to the non-availability or the cost of heating fuel. It is appreciated that varied and numerous means have been devised to overcome the problems aforesaid, however, these attempts have usually resulted in relatively costly and bulky equipment which have not overcome the few problems imposed by the necessity of providing sufficient evaporating power.

The present invention provides a distillation apparatus in which the amount of fuel necessary to provide sufficient evaporation is minimized by the utilization of waste heat which is dissipated in the operation of furnaces, hot water heaters, and the like, in the ordinary household, and/or building which is so arranged that the heat necessary to cause evaporation is recovered in the condensation of the water vapor and transferred back into the salt water to be used in evaporation.

The present invention comprises distillation apparatus for producing purified water from salt water comprising a vertically elongated vessel, means for heating an upper portion of an elongated body of salt water contained in said vessel to thereby cause evaporation of the water therefrom and thereby increase the density of the salt water in said heated portion, a storage chamber at the upper end of the vessel for collecting the water in its vaporized form, evacuating means to remove the water vapor from the collector, a vertically elongated condensing unit located below the heating means and extending to the bottom of the vessel and having a connection at its upper end to the evacuating means, said condensing unit having a plurality of heat transferring surfaces arranged to transfer the heat of the water vapor passing through the condenser to a columnar portion of said body of salt water, to thereby cause circulatory movement of the salt water in the vessel upwardly through said columnar portion and into said heated portion and downwardly from said heated portion in a path adjacent to said columnar portion, inlet means at the bottom of the vessel to eject fresh salt water into the upwardly moving column of water, and outlet means near the bottom of the vessel located in the path of the downwardly moving salt water to remove the latter from the vessel.

As stated hereinbefore, the present invention may be used in the separation of liquids other than water from a solution comprised of one or more liquids in which the liquid to be removed has a higher specific gravity and a greater rate of evaporation than the other liquids in solution. The apparatus is also not necessarily confined to the distillation of sea water, but may be used to separate any liquids which is in solution with a solid. Although reference hereinafter will only be made to the separation of pure water from a salt water solution, the description related to the construction of the apparatus and its operation and the appended claim shall be applicable mutadis mutandis to the separation of the liquid from a solution of liquids or the separation of a liquid other than water from a solution with any solid, as hereinbefore mentioned.

Figure 2:
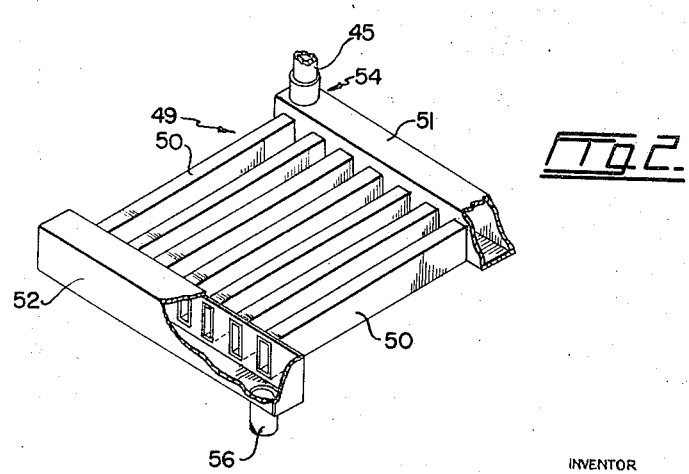
Figure 3:
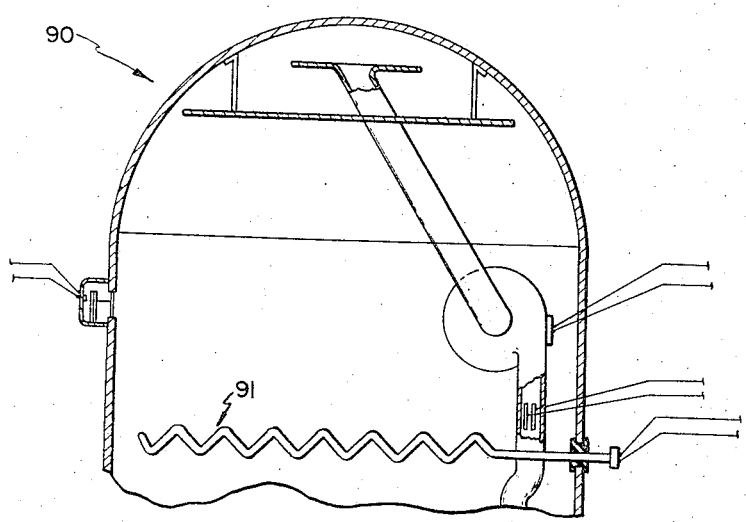

In the drawings which illustrate the embodiments of the invention,

FIGURE 1 is a vertical section of the apparatus showing, partially in section, the various components thereof, FIGURE 2 is an enlarged isometric view, partially in section, of a portion of the condenser unit, and FIGURE 3 is a view similar to FIGURE 1 of a portion of an alternate form of the apparatus.

Referring to the drawings, the numeral 10 generally designated a distilling apparatus which comprises an elongated cylindrical vessel 11 having an orifice 13 formed through the wall 14 near the bottom of the tank to which a salt water conduit 15 is secured through which fresh salt water may be injected into the central portion of the tank by a pump 16, the latter being connected by a conduit 18 to a source of salt water and driven, preferably by an electric motor, not shown. The vessel 11 is also provided with a second orifice 20 formed through the wall a little above orifice 13 to which a discharge pipe 22 is connected, said pipe extending vertically upwardly therefrom and having its discharge end 23 located a short distance downwardly from the top 12 of the vessel, whereby a body of water contained therein remains at a constant level, said level being indicated by the numeral 25. The end 23 of the pipe 22 is vented as at 24 so as to eliminate the possibility of a siphoning effect whereby the water in the vessel might be drained.

The invention, in its preferred form, is so constructed and arranged so as to utilize all the hot gases and hot air which would ordinarily be wasted in the operation of a dwelling, as a means to cause evaporation of the salt water within the vessel 11. It is proposed, therefore, to collect the gases exhausted by gas furnaces, hot water heaters, and venting fans over cooking units, and pass them by means of a conduit 30 into the vessel 11 to be discharged into the fluid therein. As shown in FIGURE 1 of the drawings, the conduit 30 extends through the side wall of the vessel at a point a little below the level 25 of the salt water therein, that portion 31 of conduit 30 within the tank is corrugated to provide relatively extensive heat transferring surfaces and is connected to an electrically driven blower 32, the latter also being immersed in the salt water, said blower being connected by a conduit 33 to a sparger ring 35 by means of which the hot gases and hot air and the like are discharged into the salt water. The sparger ring is smaller than the internal diameter of the vessel and is centrally located therein so as to provide a columnar heated portion lying substantially centrally of the vessel and an annular unheated portion lying between the columnar portion and the walls of the vessel, the central columnar portion being indicated by the numeral 37 and the outer annular portion by the numeral 38, the boundaries being between the two being indicated by vertical dotted lines given the numeral 39.

As the heated gases and air rise upwardly through the salt water, evaporation of the water takes place, the water vapor entering the space between the top 12 of the vessel and the upper level 25 of the salt water column, said space or storage chamber being given the numeral 41. Water vapor which, with the air discharged into the storage chamber, is drawn off by means of a pump 43, preferably driven by an electric motor, not shown, said electric motor also being immersed in the salt water, said pump having an intake conduit 44, the open upper end of which is situated near the top 12 of the vessel 11, and a discharge conduit 45 extending downwardly and being connected at its lower end to a condenser 46. As shown in FIGURE 1, the distilling apparatus is also provided with an annular plate 47 secured to the top 12 of the vessel by a plurality of brackets 48. The annular plate 47 is spaced from the walls of the vessel to permit the water vapor and air to blow upwardly therearound to the discharge conduit 45, but preventing water droplets which may be formed by the bursting bubbles of air and which would contain salt from entering the said discharge conduit.

The condenser 46 is of two-part construction comprising an upper section 49 in the form of a nest of a plurality of pipes 50 arranged in spaced parallel side by side relation, said pipes having a vertically elongated cross section and connected at each end thereof to a pair of headers 51 and 52. Header 51 is slightly elevated above header 52 and is connected as at 54 to the lower end of the discharge conduit 45, through which it receives the water vapor and hot gases and distributes the latter to header 52 through the slightly downwardly inclined pipes 50. The lower section of the condenser is a downwardly spiralling coil 55, the upper end 56 being connected to the bottom of header 52 and the lower end 57 being carried through the walls of the vessel 11 near the bottom thereof. The upper section 49 of the condenser is located just beneath the conduit 31 so that it lies in the upper portion of the water inside the vessel, and both upper 49 and lower 57 sections are of such width and are so located relatively to the vertical axis of the vessel that they lie within the central portion 37 of the column of water within the vessel as defined by the dotted lines 39.

Near the lower end of the coil 55 there is connected the lower end of a vertical pipe 59, the latter being formed near its lower end as a trap. The pipe 59 extends upwardly through the vessel 11 into the space above the annular plate 47, and is connected by a plurality of connecting pipes 61, the latter being formed as traps, to the coil 55 at those locations at which it lies immediately adjacent to said coil.

In the operation of the distilling apparatus 10, the vessel 11 is filled to its proper level 25 through the salt water conduit 15, said level being maintained at substantially a constant elevation by virtue of the elevation of the discharge end 23 of the discharge pipe 22. Hot air and gas are then emitted through the sparger ring 35 which causes evaporation from the surface of the salt water. The water vapor and hot air rising into the storage chamber 41 are evacuated therefrom through discharge conduit 45 into the upper section 49 of the condenser. As the hot gases and water vapor flow through the pipes 50, the heat energy of said gases and water vapor is transferred through the walls of the pipes to the surroundings of water, this action heating the salt water and causing condensation on the walls thereof of a great part of the water vapor, the gases and heated air, the condensed water and non-condensed water vapor are carried downwardly through the coil 55 which, passing downwardly through the salt water, continues to remove the heat energy from the gases and water vapor, condensing the latter as it passes downwardly until it emerges as condensed water through the end of the coil. The vapor in condensed form is removed at intervals from the coil by the connecting pipe 61, the water running downwardly through vertical pipes 59 and discharging into the coil 55.

The water in the vessel, lying above the upper section 49 of the condenser, is heated both by the condenser 49, the conduit 33 and the hot air and gases emerging through the sparger ring 35, and therefore decreases in specific gravity and therefore rises towards the surface of the water in the vessel. However, as it nears the surface, evaporation therefrom then increases the salinity of the water, thereby increasing its specific gravity. The heavily saline water is then moved radially outwardly from the welling water and moves downwardly through the annular warm water space 38. The descending water gradually loses its heat to the ascending water in the central columnar portion of the tank 37, thereby lending impetus to the upward movement of said column. As the descending water nears the bottom of the vessel, it is removed therefrom through the discharge pipe 22 by this time having lost most of its heat to said ascending water.

In the use of distilling apparatus 10, to produce water from salt water, it is preferable that the temperature of water above the sparger ring should be maintained at approximately 190° F. for most efficient operation of the apparatus. The wall of the vessel 11, enclosing that portion of the body of water above the sparger ring 35, is provided with a heat conducting membrane 62, preferably of a metallic substance, to which a heat responsive rheostatic switch 63 is secured. Switch 63 is connected by leads represented by the numeral 64 in the circuit connected to the electric motor, not shown, driving pump 43. It is not deemed necessary to describe switch 63 or the circuit last-mentioned as such switches are in common usage today and the circuitry necessary is obvious to one skilled in the electrical art. It is suffice to say, however, that the switch 63 is adapted and so adjusted that when the water above the sparger ring 35 reaches a temperature of 190° F. that it will be actuated to decrease the resistant in the electrical circuit governing the speed of the electrical motor operating pump 43 so as to increase the speed of the pump, thereby forming a partial vacuum in the storage chamber and, consequently, speeding up the rate of evaporation from the surface of the body of water in the tank. The increased rate of evaporation will, of course, tend to cool the body of water in the tank to the desired temperature level. It is, of course, obvious that if the temperature of water in the tank should tend to fall below the prescribed 190° F., the switch 63 must be operable to reduce the speed of the pump 43, thereby reversing the action aforesaid.

It will be appreciated that, should the discharge pipe 22 be plugged, the continued operation of the pump 43 will gradually cause the vessel 11 to fill with water and salt water thereby find its way down into the condenser. In order to prevent this occurrence, there is provided inside the vessel a float 72 to which is secured a vertical shaft 73 slidably extending through an aperture and collar provided on the outer surface of the tank of the vessel, the upper end 74 of the shaft lying below the toggle 75 of an electrical switch 76, the latter being connected into the circuit of the electrical motor which drives pump 16 so that upon the level 25 of the water in the tank rising beyond a predetermined level, the float 72 will move the shaft 73 upwardly to trip the toggle 75 and shut off the motor driving pump 16, thereby shutting off the flow of water into the vessel. The obstruction can then be cleared and the toggle reset.

The distilling apparatus 10 is also provided, in the discharge conduit 45, with an electrostatic high potential condenser 82, the latter having spaced parallel opposed plates 83 aligned with the flow of water vapor, water droplets and hot air therethrough. The purpose of the condenser being to attract tiny particles of water formed by condensation of water vapor as it passes through the intake conduit 44 and pump 43, the small particles therefore combining to form larger drops which fall downwardly into the upper section 49 of the condenser 46.

It will be realized that during certain times of the year, it will be difficult to obtain sufficient waste heat by way of heated discharge gases from furnaces and the like, to provide sufficient heat to cause evaporation of the salt water at the desired rate. The heated gases and the like entering the apparatus through conduit 30 may be conducted through an auxiliary heater 84, shown in FIGURE 1 in diagrammatic form as a gas jet. It will be apparent, however, that any other form of heating, such as by electricity or coal, may be employed.

It will be seen that the apparatus 10 provides a means whereby practically all the heat used to evaporate a quantity of water is recovered during the condensation thereof and again utilized in the evaporation cycle. It will also be seen that wherever possible waste heat, such as produced by electrical motors, has been utilized by immersing electrical motors in the water to be heated, said motors not only being kept cool by the water surrounding them but in turn giving up their waste heat to be utilized in the evaporation of the water.

In FIGURE 3 there is shown another form of distilling apparatus 90. Distilling apparatus 90 is similar in all respects to distilling apparatus 10, with the exception of one of the means of heating the upper portion of the water inside the apparatus. In apparatus 90, an electrical heating coil 91 is provided in place of the sparger ring and connecting conduits in pumps in distilling apparatus 10. Distilling apparatus 90 having the same condenser unit, etc. as distilling apparatus 10, it is considered that a description thereof is unnecessary.

What I claim as my invention is:

Distillation apparatus for producing purified water from salt water comprising a vertically elongated vessel, means for injecting a heated gas into an upper portion of an elongated body of salt water contained in the vessel to thereby heat said portion and cause evaporation therefrom thereby increasing the density of the remaining solution in said heated portion, a storage chamber above the body of water for collecting heated gas and water vapor, evacuating means to evacuate the heated gas and water vapor from the storage chamber, a vertically elongated vapor condensing unit located centrally of the vessel and extending from said heated portion of the body of water to the bottom of the vessel and having a connection at its upper end with the evacuating means, said condensing unit presenting a plurality of heat transferring surfaces to a central columnar portion of said body of salt water to transfer heat energy of the heated gases and water vapor to the latter, to thereby cause circulatory movement of the water in the vessel upwardly through said columnar portion into said heated portion and downwardly from the latter in a passage defined by the columnar portion and the walls of the vessel, salt water injection means at the bottom of the vessel arranged to inject fresh salt water into the upwardly moving column of water, outlet means formed in the wall of the vessel near the bottom thereof to remove the downwardly moving dense salt water, and temperature control means to maintain said heated portion at a predetermined temperature, said last-mentioned means including a heat responsive electrical switch at said heated portion arranged to control the flow of water vapor and heated gases through the evacuating means thereby increasing or decreasing the rate of evaporation from the body of salt water.

References Cited

UNITED STATES PATENTS

| | | | |
|---|---|---|---|
| 849,579 | 4/1907 | Siebel | 203—26 |
| 1,931,838 | 10/1933 | Beraud | 202—206 XR |
| 2,153,599 | 4/1939 | Thomas | 55—154 |
| 2,616,839 | 11/1952 | Ames | 202—234 XR |
| 2,803,590 | 8/1957 | Skow | 203—24 XR |
| 3,165,452 | 1/1965 | Williams | 159—16 |

NORMAN YUDKOFF, *Primary Examiner.*

D. EDWARDS, *Assistant Examiner.*